United States Patent [19]

Bergmann et al.

[11] 4,405,330
[45] Sep. 20, 1983

[54] NAVY DISPERSE DYE MIXTURES

[75] Inventors: Udo Bergmann, Darmstadt; Helmut Degen, Frankenthal; Guenter Hansen, Ludwigshafen; Reinhold Krallmann, Weisenheim; Wolf-Dieter Kermer, Fussgoenheim, all of Fed. Rep. of Germany

[73] Assignee: BASF Aktiengesellschaft, Rheinland-Pfalz, Fed. Rep. of Germany

[21] Appl. No.: 433,393

[22] Filed: Oct. 8, 1982

[30] Foreign Application Priority Data

Oct. 28, 1981 [DE] Fed. Rep. of Germany ....... 3142609

[51] Int. Cl.$^3$ .................. C09B 29/08; D06P 1/04
[52] U.S. Cl. ........................................... 8/639; 8/662; 8/696; 8/922
[58] Field of Search ..................... 8/639, 662, 696

[56] References Cited

U.S. PATENT DOCUMENTS

| 3,342,804 | 9/1967 | Mueller ............................. 8/696 |
| 3,413,075 | 11/1968 | Rotcop et al. ..................... 8/639 |
| 4,321,055 | 3/1982 | Hansen et al. ..................... 8/639 |
| 4,329,148 | 5/1982 | Hansen et al. ..................... 8/639 |

FOREIGN PATENT DOCUMENTS 1943056 3/1971 Fed. Rep. of Germany.
1943057 3/1971 Fed. Rep. of Germany.
3112427 10/1982 Fed. Rep. of Germany.
1239106 7/1971 United Kingdom.

Primary Examiner—A. Lionel Clingman
Attorney, Agent, or Firm—Oblon, Fisher, Spivak, McClelland & Maier

[57] ABSTRACT

Navy mixtures which contain dyes of the formula I

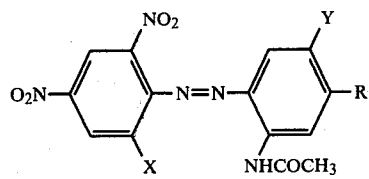

where
X is chlorine or bromine,
Y is hydrogen, methoxy or ethoxy and
R is $N(C_2H_5)_2$, $N(CH_2CH=CH_2)_2$ or $N(C_2H_4OCOCH_3)_2$, the mixtures being composed of 10–70% of dyes with Y=H and R=$N(C_2H_5)_2$, 5–40% of dyes with Y=$OCH_3$ or $OC_2H_5$ and R=$N(CH_2-CH=CH_2)_2$ and 5–80% of dyes with Y=$OCH_3$ or $OC_2H_5$ and R=$N(C_2H_4OCOCH_3)_2$.

The novel mixtures have excellent tinctorial properties and give very fast dyeings on synthetic polyesters.

2 Claims, No Drawings

NAVY DISPERSE DYE MIXTURES

The present invention relates to navy mixtures which contain dyes of the formula I

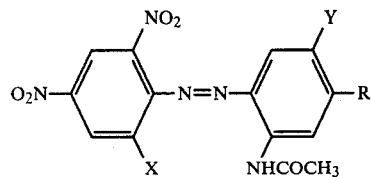

where
X is chlorine or bromine,
Y is hydrogen, methoxy or ethoxy and
R is $N(C_2H_5)_2$, $N(CH_2CH=CH_2)_2$ or $N(C_2H_4OCOCH_3)_2$,
the mixtures being composed of 10–70% of dyes with Y=H and R=$N(C_2H_5)_2$, 5–40% of dyes with Y=$OCH_3$ or $OC_2H_5$ and R=$N(CH_2—CH=CH_2)_2$ and 5–80% of dyes with Y=$OCH_3$ or $OC_2H_5$ and R=$N(C_2H_4OCOCH_3)_2$. In the constituents of the mixture, X may be either chlorine or bromine, but the latter is preferred.

The invention more particularly relates to mixtures which contain the dyes (in the above sequence) in the proportion of 15–55%: 7–30%: 25–75%.

The novel compounds have excellent tinctorial properties and give navy dyeings, with a neutral hue by artificial light and good or very good fastness characteristics, on synthetic polyesters. The mixtures are advantageously prepared by mixing the individual components.

In the Examples, parts and percentages are by weight.

EXAMPLE 1

Navy and violet dyes of the general formula I

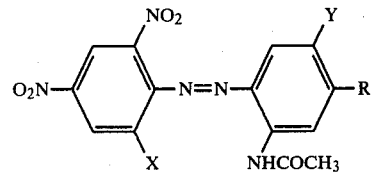

are prepared in a conventional manner and combined by mechanical mixing to give the novel dye mixtures.

9 parts of the dye with X=bromine, Y=methoxy and R=$N(CH_2—CH=CH_2)_2$, 16 parts of the dye with X=bromine, Y=hydrogen and R=$N(C_2H_5)_2$ and 75 parts of the dye with X=bromine, Y=methoxy and R=$N(C_2H_4OCOCH_3)_2$ are mixed in a ball mill, to give 100 parts of a dye mixture according to the invention.

On synthetic polyester, the mixture gives deep navy dyeings with good fastness characteristics.

EXAMPLE 2

17.5 parts of the dye with X=bromine, Y=ethoxy and R=$N(CH_2—CH=CH_2)_2$, 32.5 parts of the dye with X=bromine, Y=hydrogen and R=$N(C_2H_5)_2$, and 50 parts of the dye with X=bromine, Y=ethoxy and R=$N(C_2H_4OCOCH_3)_2$ are mixed in a ball mill to give 100 parts of a dye mixture according to the invention.

On synthetic polyester, the dye gives deep navy dyeings having good fastness characteristics.

EXAMPLE 3

25 parts of the dye with X=chlorine, Y=methoxy and R=$N(CH_2—CH=CH_2)_2$, 50 parts of the dye with X=bromine, Y=hydrogen and R=$N(C_2H_5)_2$, and 25 parts of the dye with X=bromine, Y=methoxy and R=$N(C_2H_4OCOCH_3)_2$ are mixed in a ball mill to give 100 parts of a dye mixture according to the invention.

On synthetic polyester, the dye gives deep navy dyeings having excellent fastness characteristics.

EXAMPLE 4 (HT process)

100 parts of a polyester yarn are treated in a dye bath which contains 1,500 parts of water, 1.8 parts of the finely divided dye mixture prepared in Example 1 and 1.8 parts of a product obtained by sulfonating the adduct of 50 moles of ethylene oxide and 1 mole of sperm oil alcohol. Dyeing is started at 60° C., the temperature is raised to 125° C. in 20 minutes and dyeing is continued for a further 90 minutes at this temperature.

A deep navy dyeing having very good fastness characteristics is obtained.

EXAMPLE 5 (Thermosol process)

A polyester fabric is impregnated, on a three-roll padder, with a dyeing liquor which comprises 48 parts of the finely divided dye mixture prepared in Example 3, 12 parts of a 20% strength aqueous solution of a copolymer of acrylic acid and acrylamide and 940 parts of water.

The fabric is impregnated to give 60% wet pick-up, subjected to intermediate drying at 120° C. and thermosoled for 60 seconds at 210° C.

A deep navy dyeing having excellent fastness characteristics is obtained.

EXAMPLE 6

A polyester fabric is printed with a paste which comprises 60 parts of the finely divided dye mixture prepared in Example 2, 20 parts of a reaction product of 1 mole of castor oil and 40 moles of ethylene oxide, 600 parts of a crystal gum thickener, 10 parts of triisobutyl phosphate and 310 parts of water. The printed fabric is dried and then steamed for 15 minutes under 1.5 atmospheres gage pressure.

The deep navy print obtained has excellent fastness characteristics.

We claim:

1. A navy disperse dye mixture which contains dyes of the formula

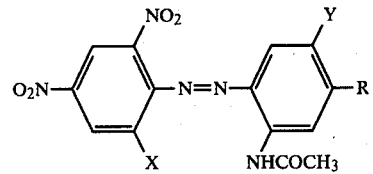

where
X is chlorine or bromine,
Y is hydrogen, methoxy or ethoxy and
R is $N(C_2H_5)_2$, $N(CH_2CH=CH_2)_2$ or $N(C_2H_4OCOCH_3)_2$,
the mixtures being composed of 10–70% of dyes with Y=H and R=$N(C_2H_5)_2$, 5–40% of dyes with Y=$OCH_3$ or $OC_2H_5$ and R=$N(CH_2—CH=CH_2)_2$ and 5–80% of dyes with Y=$OCH_3$ or $OC_2H_5$ and R=$N(C_2H_4OCOCH_3)_2$.

2. A mixture as claimed in claim 1, containing dyes where X is chlorine.

* * * * *